United States Patent
Mathieu et al.

(10) Patent No.: US 7,746,801 B2
(45) Date of Patent: Jun. 29, 2010

(54) METHOD OF MONITORING A NETWORK

(75) Inventors: Guy Mathieu, Orsay (FR); Michel Chevanne, Clamart (FR); Emmanuel Marilly, Saint-Michel-sur-Orge (FR)

(73) Assignee: Alcatel-Lucent, Paris (FR)

( * ) Notice: Subject to any disclaimer, the term of this patent is extended or adjusted under 35 U.S.C. 154(b) by 1588 days.

(21) Appl. No.: 11/017,940

(22) Filed: Dec. 22, 2004

(65) Prior Publication Data

US 2005/0169190 A1 Aug. 4, 2005

(30) Foreign Application Priority Data

Dec. 26, 2003 (EP) .................................. 03293357

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................... 370/252; 370/352; 370/400; 370/401; 709/224

(58) Field of Classification Search ................. 370/252, 370/352, 400, 401; 709/224
See application file for complete search history.

(56) References Cited

U.S. PATENT DOCUMENTS

| 6,363,056 | B1 | 3/2002 | Beigi et al. |
| 2002/0055999 | A1 | 5/2002 | Takeda |
| 2003/0223367 | A1 | 12/2003 | Jones et al. |

FOREIGN PATENT DOCUMENTS

| EP | 0 996 254 A2 | 4/2000 |
| EP | 1 202 491 A2 | 5/2002 |

*Primary Examiner*—Quynh H Nguyen
(74) *Attorney, Agent, or Firm*—Harness, Dickey & Pierce

(57) ABSTRACT

The present invention relates to a method of monitoring a communication network (100) between an ingress node (102) and an egress node (104), comprising:
- a first step of assigning first time stamps to data packet samples of a data stream, by the ingress node,
- a second step of assigning of second time, by the egress node,
- a third step of determining an evaluation of network performances, these first, second and third steps being performed according to an operating procedure.

The method of the invention is characterized in that the ingress node performs further steps of determining a quality measurement of the data stream and, by comparing it to a quality control profile, determining the operating procedure.

12 Claims, 6 Drawing Sheets

METHOD OF MONITORING A NETWORK

FIELD OF THE INVENTION

The present invention relates generally to communications networks and more particularly without limitation, to a method of monitoring a network.

BACKGROUND AND PRIOR ART

The operators and users of enterprise networks prefer that their networks be predictable and provide consistent performance. Predictability and consistency are often more important than the raw capabilities of the network, i.e. a network that provides a consistent medium throughput is often considered more desirable than a network which provides very high throughput at some times, but performs poorly at other times. For many business applications, it is important that transactions be completed in a predictable manner while the time taken for the transactions to complete is relatively unimportant (provided it does not exceed a reasonable limit).

Prior art solutions provide network predictability by pre-configuring the network. This does not work in an IP network, because IP is dynamic and connectionless, and therefore relatively unpredictable. The typical enterprise network environment consists of several campus area networks interconnected by a wide area backbone network. The campus networks usually deploy high-speed links, and perform reasonably well. Congestion tends to occur in the backbone network, which consists of relatively slower speed point-to-point links, and in some of the campus networks which house the servers.

An approach is needed which will provide predictability on an IP backbone network, and do so for backbones with varying degrees of capability. If the network provider can predict the performance of the network, then he can implement service level agreements. A service level agreement is a formal contract entered into by a service provider and its customers. The service provider contracts to transport packets of electronic data between customer premise networks (branch offices, data centers, server farms, etc.) across the provider's backbone network with certain assurances on the quality of the service. This is known as the Service Level Agreement (SLA). The SLA specifies customer expectations of performance in terms of parameters such as availability (bound on downtime), delay, loss, priority and bandwidth for specific traffic characteristics. An SLA includes acceptable levels of performance, which may be expressed in terms of response time, throughput, availability (such as 95% or 99% or 99.9%), and expected time to repair.

SLAs vary greatly from one network to the next, and from one application to another running on the same network. They are normally based on some level of expected activity. For example, if a large airline wants to ensure that the lines at the ticket counter do not get overly long due to poor response time at the ticketing terminals, some estimate must be made of expected workload, so that the network administrator can be prepared with the necessary resources to meet that workload and still remain compliant with the performance terms of the SLA. Another example is audio/video conferences where a certain level of service needs to be guaranteed.

Managing an SLA is an important task because of the revenue implications of failure to support mission-critical business applications. The problem is exacerbated due to diversity of the traffic and due to poor and varying degree of service differentiation mechanisms within the backbone networks. Commercially significant traffic must be prioritised above workloads which do not have a critical time dependency for the success of the business. Many of these workloads in an IP environment are far more volatile than those which have traditionally been encountered in the prior art. In order to meet customer requirements in this environment, a service provider must provide a large excess capacity at correspondingly high charges.

This situation dramatizes the need for effective tools which can monitor the performance of the IP network or system delivering a service over the IP network. Also, there is a need for effective controls which allow the service provider of an IP network to manipulate the priority of the various workloads to be managed.

U.S. Pat. No. 6,459,682 shows a method of controlling packet traffic in an IP network of originating, receiving and intermediate nodes to meet performance objectives established by service level agreements. Traffic statistics and performance data such as delay and loss rates relating to traffic flows are collected at intermediate nodes. A control server processes the collected data to determines data flow rates for different priorities of traffic. A static directory node is used to look up inter-node connections and determine initial traffic classes corresponding to those connections. The rates are combined with the initial traffic classes to define codes for encoding the headers of packets to determine their network priority.

U.S. Pat. No. 6,519,264 shows a method for measuring a rate of message element traffic over a message path in a communications network. The path includes at least one connection and is associated with a maximum rate of transmission. The path is periodically polled for transmission of a message element, the polling being performed at a polling rate associated with polling intervals which are at least as frequent as the maximum rate of transmission. If transmission of a message element is detected during a polling interval, a running count of such detection is incremented, the running count of detection being associated with the connection over which the message element was detected. If transmission of a message element is not detected, a running count of such non-detection is incremented, the running count of non-detection being associated with inactivity of the message path. During each polling interval, an oldest stored value is retrieved from a memory which includes a preselected number of stored values that correspond to an equal number of most recent sequential events of detection and non-detection. Each stored value which represents an event of detection corresponds to an identifier denoting the connection over which the message element was detected. Each stored value which represents an event of non-detection corresponds to an identifier denoting inactivity of the message path. Following retrieval during each polling interval, the running count of detection associated with the connection corresponding to the identifier of the retrieved value is decremented if the retrieved value represents an event of detection. The running count of non-detection is decremented if the retrieved value represents inactivity. The retrieved value is thereafter replaced with a value corresponding to an identifier which denotes the connection over which the message element was detected if transmission was detected. Otherwise the retrieved value is replaced in the memory with a value corresponding to an identifier which denotes inactivity if transmission was not detected. The foregoing steps are repeated for so long as the measurement is undertaken. The rate of message element traffic over a connection of the message path is proportional to the running count of detection associated with the connection.

U.S. Pat. No. 6,363,056 shows a network monitoring method where incoming data packets are time stamped by an ingress node and time stamped again by an egress node. The difference between the two time stamps serves to calculate the delay.

Other network monitoring and managing tools are commercially available from Brix networks (http://www.brixnetworks.com/) and Ipanema Technologies (http://www.ipanematech.com/).

A common disadvantage of prior art network monitoring and control programs is the expense for performing the network measurements, especially in terms of additional network load.

SUMMARY OF THE INVENTION

The idea of the invention comes from the noticing that the need for measurement depends on the quality of the data streams. The better the data stream is, the less need for measurement.

For this purpose, the invention consists as a first object in a method of monitoring a network between an ingress node and an egress node of a communication network, comprising:
 a first step of assigning first time stamps to data packet samples of a data stream, by the ingress node,
 a second step of assigning second time stamps to the data packet samples of the data stream, by the egress node,
 a third step of determining an evaluation of network performances, according at least of the first and second time stamps.

These first, second and third steps are performed according to an operating procedure.

The method is characterized in that the ingress node performs further steps of determining a quality measurement of the data stream and, by comparing it to a quality control profile, of determining the operating procedure.

According to an embodiment of the invention, the operating procedure comprises a sampling rate at which the data packet samples are selected for time stamping by the ingress and egress nodes.

According to an embodiment of the invention, the operating procedure comprises a selection between at least
 sending from the ingress node to the egress node, measurement tickets comprising parameters about the operating procedure, and configuration of the second step according to these parameters (i.e. assigning of second time stamps to the data packet samples of the data stream).
 Sending from the ingress node to a monitoring device, a measurement ticket comprising parameters about the operating procedure and provisioning by these monitoring device of the parameters for configuring the second step (i.e. assigning of second time stamps to the data packet samples of the data stream).

These two embodiments could be implemented separately or cumulative.

According to an embodiment of the invention, the quality control profile comprises at least one criterion and at least one threshold, the determination of the operating procedure being triggered by the crossing of one of the at least one threshold by the at least one criterion.

According to an embodiment of the invention, the quality control profile is provisioned by this monitoring device.

As a second object, the invention consists in a ingress node of a communication network comprising
 means to assign first time stamps to data packet samples of a data stream,
 means to emit measurement tickets, comprising at least the first time stamps, for determination of an evaluation of network performances.

These means are configured according to an operating procedure.

According to the invention, the ingress node is characterized in that it further has means
 for determining a quality measurement of the data stream and,
 by comparing this quality measurement to a quality control profile, for determining said operating procedure.

The invention further comprises the third object consisting in a a distributed computer program product, comprising software means for implementing the method here-above described.

Therefore, the invention provides an adaptive mechanism for network management: depending on the quality of the data stream, the invention can balance the consumption of the bandwidth and the need for accurate measurement. This has the advantage that the network monitoring can be performed by using minimal network bandwidth while preserving monitoring accuracy.

BRIEF DESCRIPTION OF THE DRAWINGS

In the following preferred embodiments of the invention will be described by way of example only by making reference too the drawings in which.

DETAILED DESCRIPTION

Figure 1:
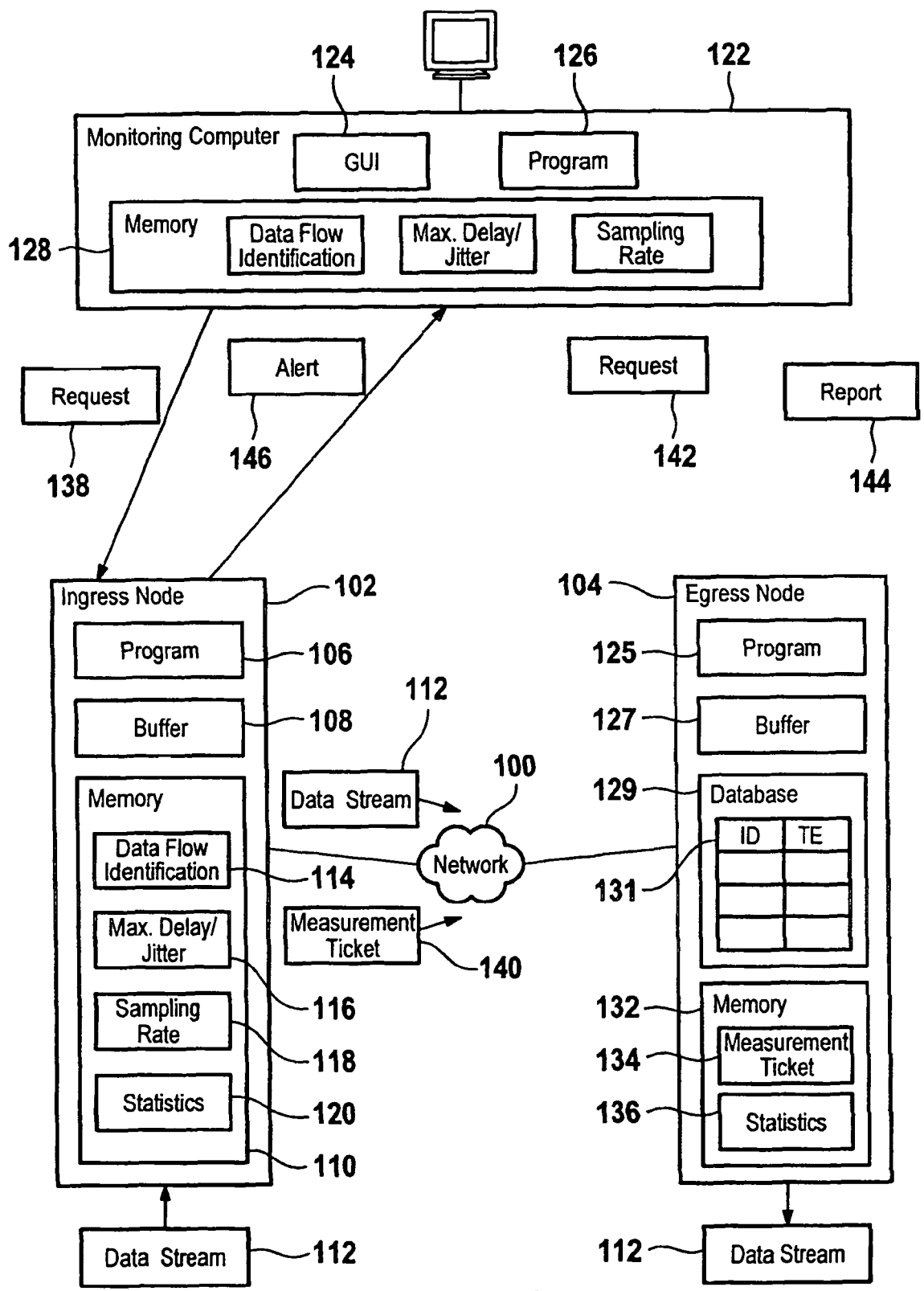
FIG. 1 is a block diagram of an embodiment of a network in accordance with the present invention.

FIG. 1 illustrates a first embodiment of the invention. It shows communication network 100 that has ingress node 102 and egress node 104. For example communication network 100 is an IP network for transmission of IP data packets.

Ingress node 102 has program 106, buffer memory 108 and memory 110. Program 106 serves to control operation of ingress node 102 and includes routing software and so-called end-to-end measurement software. Buffer memory 108 serves to buffer data packets of incoming data stream 112. For example, buffer memory 108 is implemented as a store-and-forward or as a cut-through buffer.

Memory 110 has storage locations 114, 116, 118, and 120. Storage location 114 serves for storage of a data flow identification than enables ingress node 102 to identify data packets belonging to data stream (or data flow) 112. For example, data stream 112 can be identified by means of a port address of ingress node 102 where data stream 112 is received. Alternatively an IP address can be used to identify data packets of data stream 112 by ingress node 102.

Storage location 116 serves for storage of a profile for controlling the quality of the data flow (later called "Quality Control Profile"). It can for instance be a maximum value for a data flow characteristic parameter. For example the maximum value for an allowed delay between two consecutive data packets of data stream 112 is stored in storage location 116. In addition or alternatively a maximum allowable jitter of the delay occurring between consecutive data packets in data stream 112 is stored in storage location 116. Some other parameters could be considered within the quality control profile, in addition to or in replacement of the previously mentioned parameters, like a maximum rate for packet loss, packet size etc.

Storage location 118 serves for storage of the sampling rate for the sampling of data stream 112. For example, the sampling rate can be expressed as a number X where X indicates that every Xth data packet of data stream 112 is to be sampled.

Storage location 120 serves for storage of a statistical measure as regards data stream 112, such as mean delay between data packets, delay variation and/or packet sizes of data stream 112. It is to be noted that ingress node 102 can receive additional data streams concurrently with data stream 112 that are or are not considered for the purpose of network monitoring.

Ingress node 102 can communicate with a monitoring device 122. The monitoring device can be a monitoring computer 122 that has graphical user interface (GUI) 124 and program 126. In another embodiment, the monitoring device can be any centralized system, which may have communication means to communicate with a computer having a GUI.

By means of graphical user interface 124 a user can enter a data flow identification for selection of data stream 112 for the purpose of network monitoring. Further a user can enter a Quality Control Profile, for instance a maximum delay and/or jitter or other parameter of the data packets of the selected data stream. It can also enter a sampling rate e.g. the number X. These data are stored in memory 128 of monitoring computer 122.

Egress node 104 has program 125 that is similar to program 106 and buffer memory 127. Further, in one embodiment, the egress node 104 has database (management information base) 129 for storing table 131. Table 131 relates identifiers (ID) of data packets that have been received by egress node 104 to corresponding arrival time stamps TE that have been assigned to the data packets by the egress node 104.

Further egress node 104 has memory 132 having storage location 134 for storing of a measurement ticket and storage location 136 for storing of statistical measures.

Program 125 serves to control operation of egress node 104. Buffer memory 127 is similar to buffer memory 108 and can be implemented as a store-and-forward or a cut-through buffer memory depending on the implementation.

Like the ingress node 102, the egress node 104 has means to communicate with the monitoring device 122 for the purpose of performing an end-to-end measurement.

In operation, monitoring device 122 sends request 138 to ingress node 102. Request 138 contains the data flow identification, the quality control profile (e.g. maximum delay and/or jitter) and the sampling rate X (and possibly other parameters) from memory 128 that have been previously entered by a user through graphical user interface 124. The data flow identification, quality control profile (e.g. maximum delay and/or jitter) and sampling rate X that are transmitted by means of request 138 from monitoring computer 122 to ingress node 102 are stored in respective storage locations 114, 116, and 118.

As a consequence data stream 112 that is identified by the data flow identification is used as a basis for the monitoring of network 100. For this purpose every Xth data packet of data stream 112 is time stamped by program 106. The time stamp and the identifier of the data packet sample are put into message 140 that is emitted by the ingress node 102. Message 140 is also referred to as 'measurement ticket'.

In a first type of operating procedure, which is illustrated by FIG. 1, the measurement ticket 140 is transmitted from the ingress node 102 to the egress node 104 (we will see later on that in an alternate operating procedure, this measurement ticket could be sent to the monitoring device 122 instead).

It is to be noted that message 140 is transmitted independently from data stream 112 over network 100. Data packets of data stream 112 that are received by egress node 104 are time stamped by program 125. The arrival times TE assigned to the data packet of data stream 112 by egress node 104 are stored in table 131 with the corresponding IDs of the time stamped data packets as keys.

When measurement ticket 140 is received by egress node 104 the ID and time stamp contained in the measurement ticket are stored in storage location 134 of egress node 104. Program 125 performs a database query by means of the identifier of the measurement ticket stored in storage location 134 in order to retrieve the arrival time stamp TE of the corresponding data packet from database 129. The values of the two time stamps are subtracted and the result of the subtraction is stored in storage location 136. As this is an ongoing process a statistical measure regarding the average transmission delay can be calculated on this basis by program 125. Possibly, history data that is stored in table 131 that has arrival time stamps TE preceding the retrieved arrival time stamp TE are erased from table 131 in order to keep database 129 as small as possible.

In this embodiment, an operator can enter a request into the monitoring device 122 (via GUI associated to it, for instance), so that the request 142 is sent to the egress node 104 in order to obtain a report 144 regarding the performance of network 100. For example report 144 contains the statistical measure that has been calculated by the program 125 on the basis of the differences between the corresponding time stamps.

This has the advantage that the load of the network 100 with additional traffic for the purpose of monitoring network performance is kept at a minimum as well as the additional data processing that is performed in the ingress node 102 and the egress node 104. Further, this method does not require that information regarding individual data packets is provided to monitoring device 122 for the purposes of evaluation. On the contrary, monitoring device 122 only receives aggregated data, i.e. report 144, descriptive of the network performance.

Figure 2:
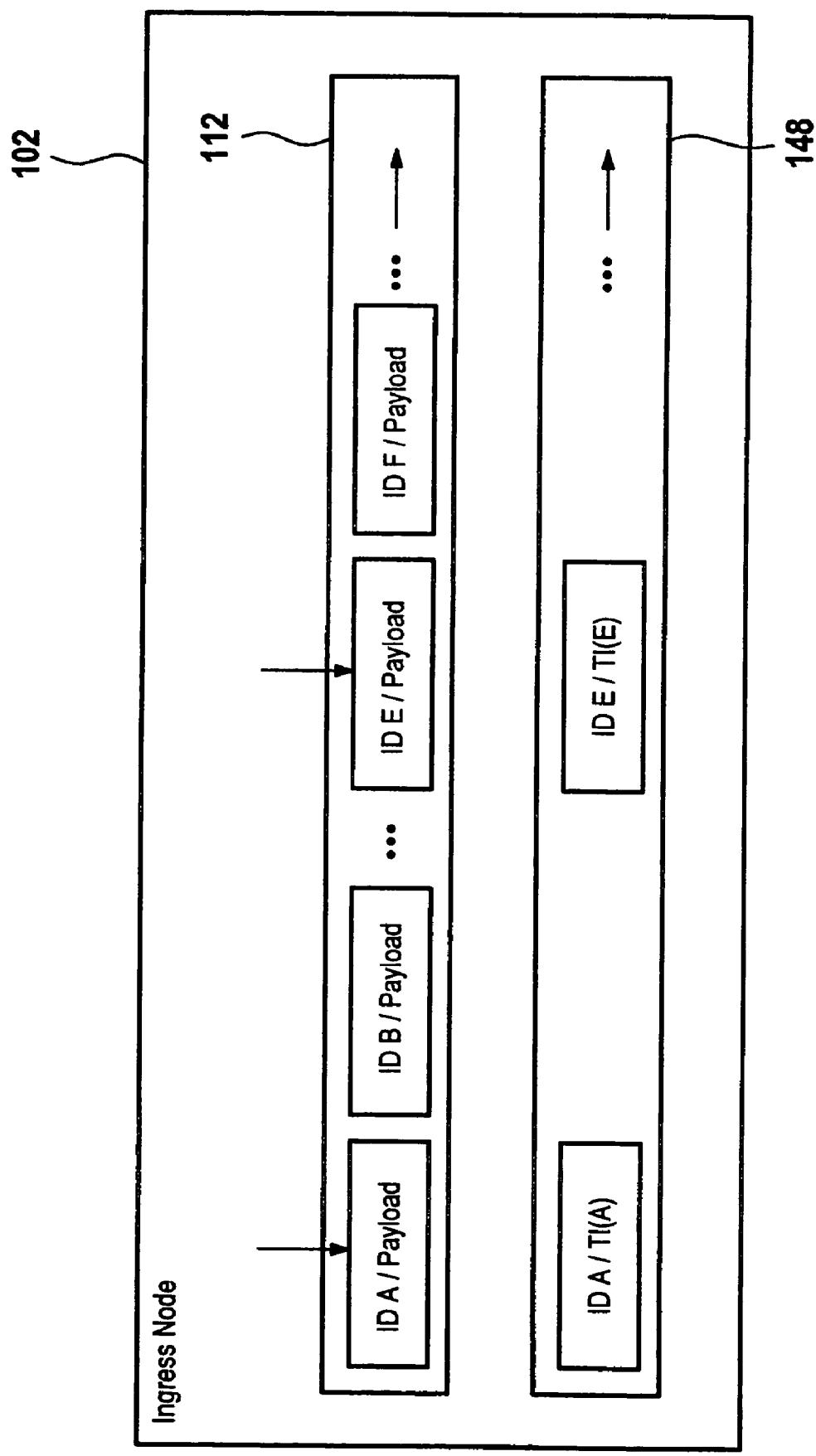
FIG. 2 is illustrative of the time stamping of data packet samples in the ingress node.

FIG. 2 illustrates the process of sampling and time stamping that is performed by ingress node 102. Data stream 112 has data packets A, B, C, D, E, F, G, H . . . that are identified by corresponding identifiers ID A, ID B, ID C, ID D, ID E, ID F, ID G, ID H . . . In the example considered here the sampling rate X is set to 4. This means that every forth data packet of data stream 112 is sampled. Hence the time stamp TI (A) is assigned to data packet A, time stamp TI (E) is assigned to data packet E, etc. by the program 106. For each data packet sample A, E . . . , the program 106 generates a message 140 that carries the identifier of the data packets and its time stamp. This way, a sequence 148 of messages 140 is generated and transmitted over network 100 to egress node 104.

Figure 3:
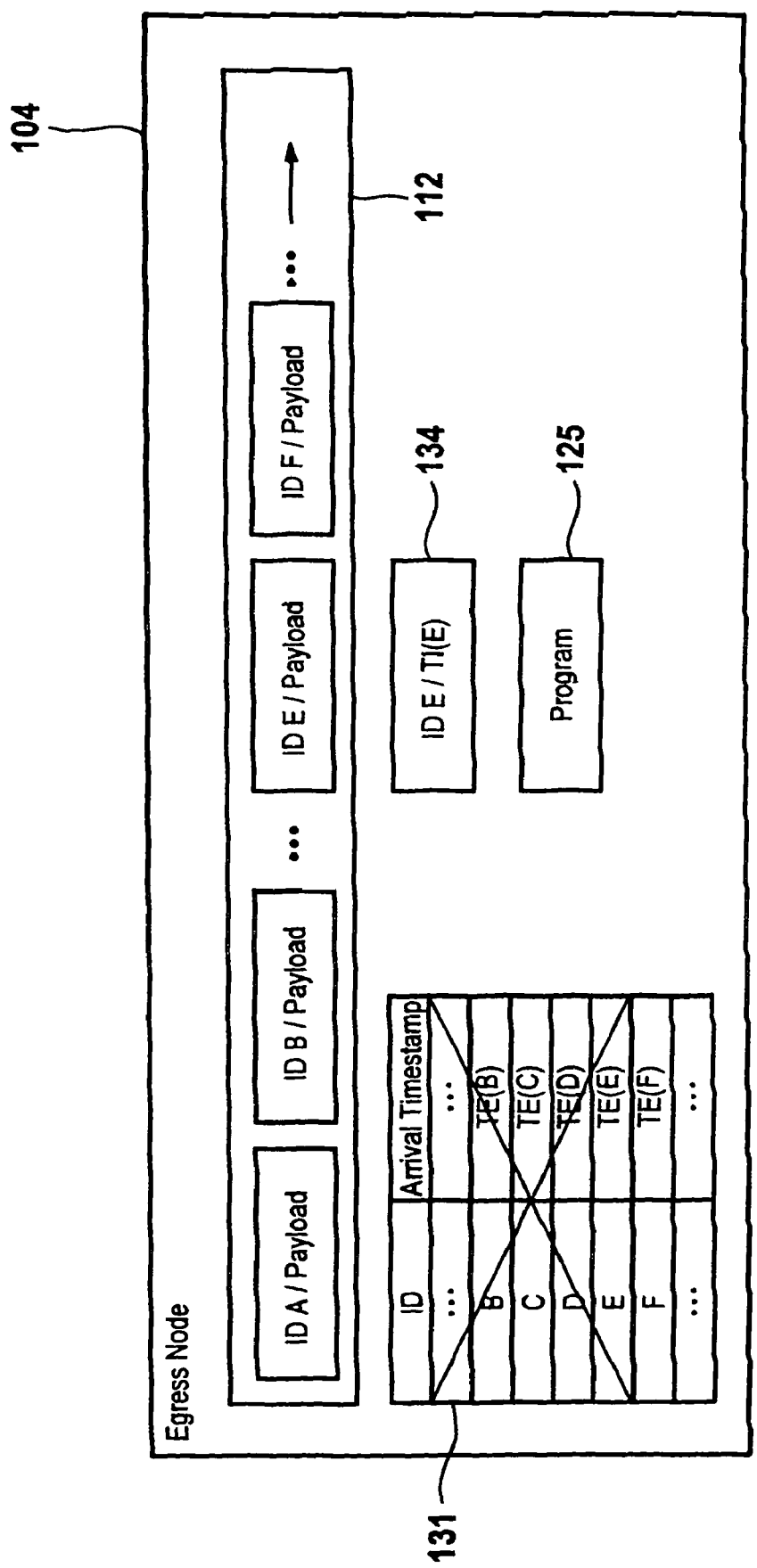
FIG. 3 is illustrative of the evaluation performed in the egress node.

FIG. 3 illustrates the operation performed by egress node 104. Egress node 104 receives data stream 112. Each time a data packet of data stream 112 is received an arrival time stamp TE is assigned to that data packet. The identifier ID of the received data packet and its arrival time stamp TE (ID) is stored in database table 131 by program 125. When a message 140 is received it is stored in storage location 134.

For example, when message 140 with the tuple (ID E; TI (E)) is received the tuple is stored in storage location 134. Next program 125 performs a database query by means of database key=E in order to retrieve the arrival time stamp TE (E). The difference of TE (E) and TI (E) is the transmission time of the data packet E from the ingress node 102 to egress node 104. Transmission times of data packet samples of data stream 112 which are thus obtained form the basis to calculate a statistical measure as regards the performance of the communication network 100.

According to an embodiment of the invention, when the tuple having key=E is retrieved in database table 131 this tuple and all tuples preceding this tuple are erased from table 131 as they are no longer needed for consecutive evaluations. This way the size of table 131 can be kept at a minimum.

Figure 4:
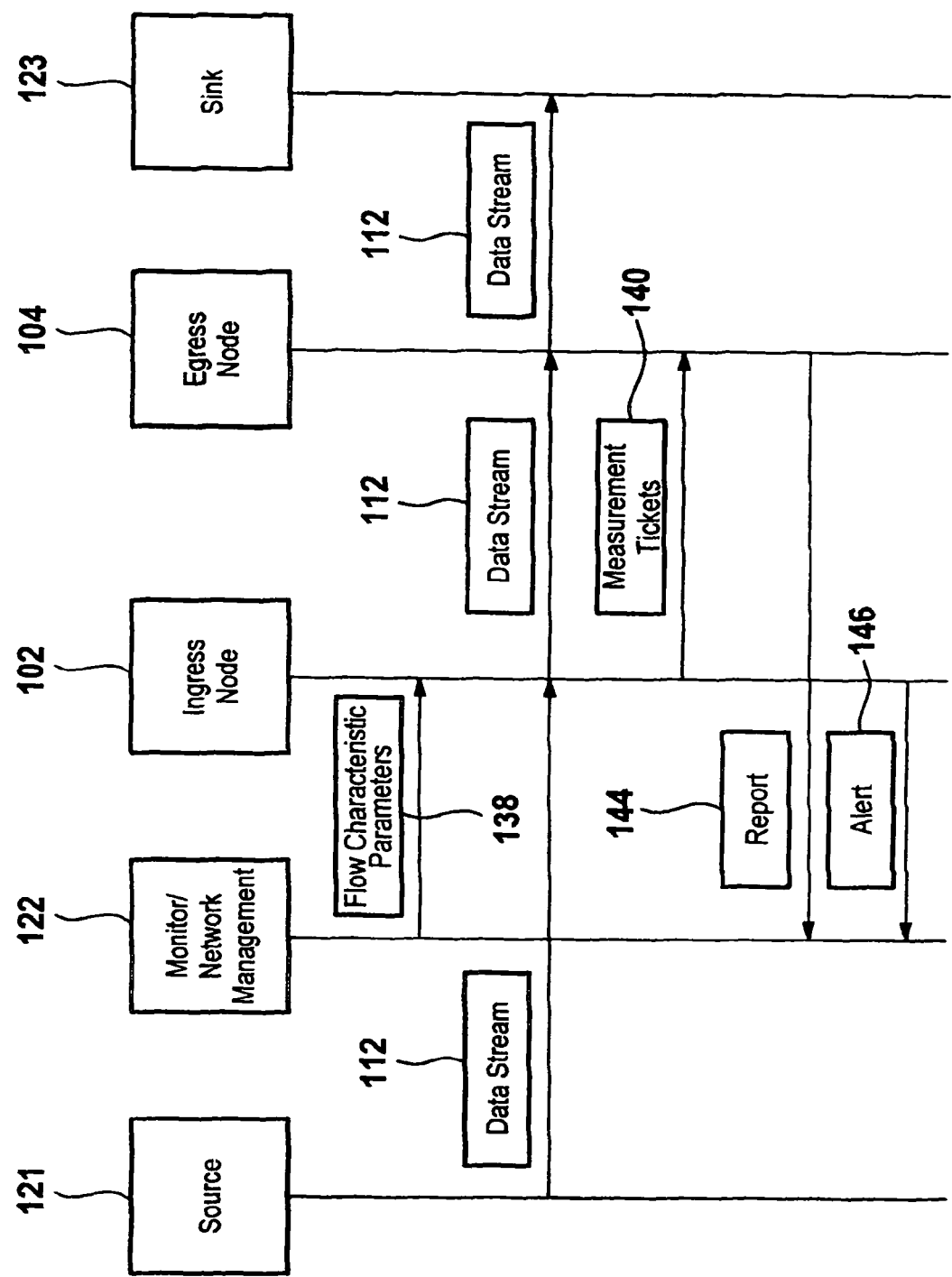
FIG. 4 is an object relationship diagram.

FIG. 4 shows a corresponding object relationship diagram. Data stream 112 originates from data source 121 and is received by ingress node 102 from where it is sent via the network to egress node 104. From there the data stream 112 is transmitted to data sink 123. Monitoring computer 122 sends request 138 containing flow characteristic parameters to ingress node 102.

As long as data stream 112 remains within the limits set by the flow characteristic parameters ingress node 102 generates measurement tickets 140 for every Xth data packet of data stream. On this basis egress node 104 generates report 144 that is sent to monitoring computer 122 as a push or a pull service. In case data stream 112 exceeds the limits that are defined by the flow characteristic parameters ingress node 102 sends alert message 146 to monitoring computer 122.

Figure 5:
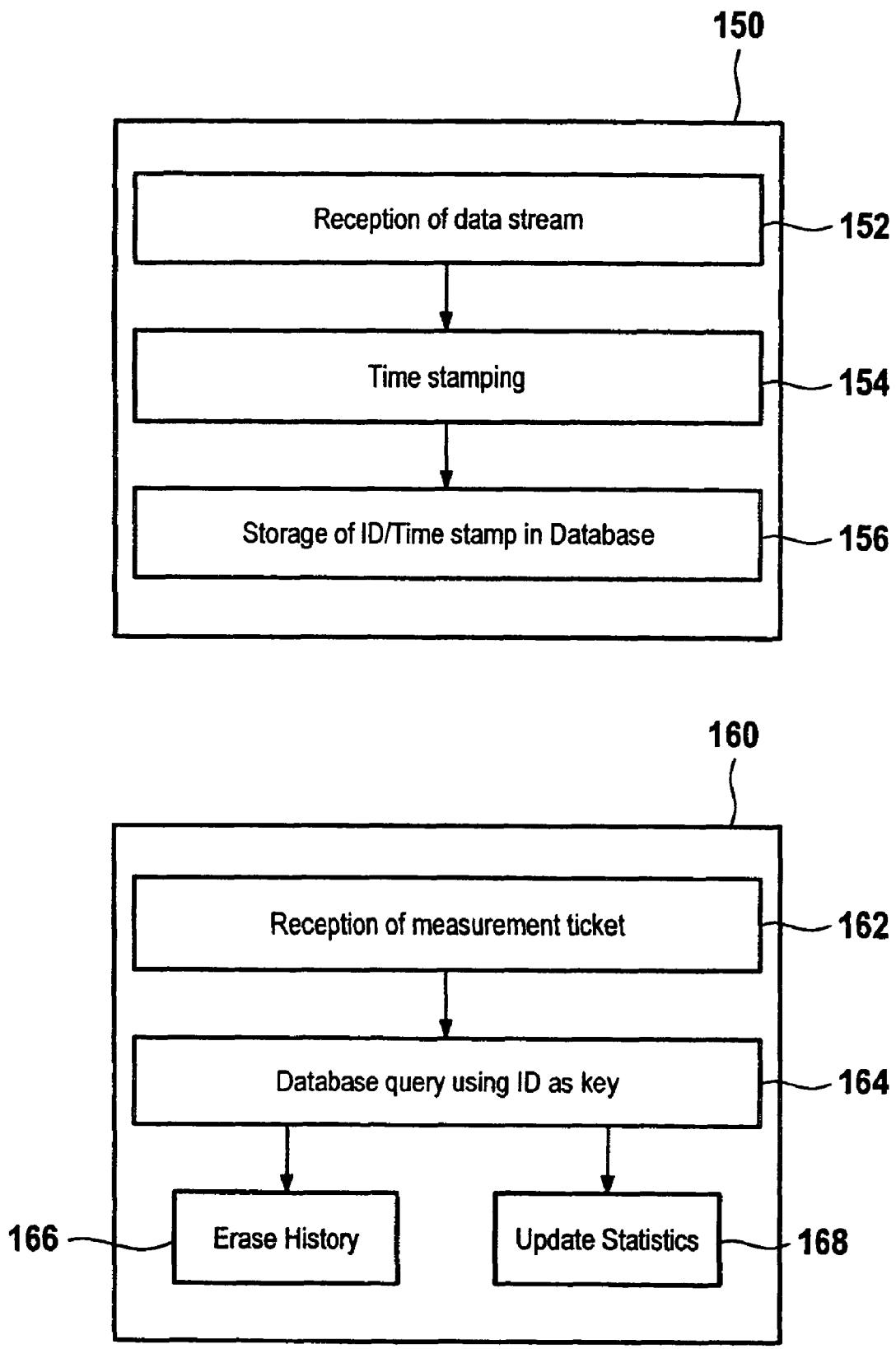
FIG. 5 illustrates an embodiment of a method performed by the egress node.

FIG. 5 illustrates the processes that are performed by egress node 104. Egress node 104 performs process 150 that consists of steps 152, 152, 154 and 156; in step 152 a data packet of the data stream 112 is received. The data packet is time stamped in step 154 and the time stamp TE together with the ID of the data packet is stored in database 129. This process is performed for every data packet of the data stream 112 that is received by egress node 104.

In parallel egress node 104 performs procedure 116; in step 162 message 140, i.e. a 'measurement ticket', is received. In response egress node 104 performs a database query using the identifier contained in the measurement ticket as a key. As a result of the database query the arrival time stamp TE of the corresponding data packet is retrieved and used in step 168 in order to update the network performance statistics. Further, in step 166 the historic data stored in the database, i.e. tuples having a TE that precedes the TE of the retrieved tuple, is erased.

Another possible operating procedure is to have the measurement tickets 140 be sent from the ingress node 102 to the monitoring device 122. In this case, the monitoring device also provisions the egress node 104 about the sampling rate to apply (as well as other parameters mentioned previously). The ingress nodes and the egress nodes perform the sampling and time stamping of the data flows independently and send measurement reports to the monitoring device, on a measurement per measurement basis or on a more aggregated basis.

As said previously, the program 106 measures the quality of the data stream 112 and compares it to the quality control profile, which is stored in the storage location 116. According to the result of this comparison, a decision could be taken by the program 106 for determining the operating procedure.

The decision can concern whether one should use
- the first described operating procedure, where the measurement ticket 140 is sent to the egress node 104 to instruct it about the sampling and measure to perform, or
- the second described operating procedure, where the measurement ticket 140 is sent to the centralized monitoring device 122.
- Another operating procedure.

The determination of the operating procedure further comprises the determination of the sampling rate (stored in the storage location 118). This sampling rage can range from a very low value in the situation where the data stream 112 has a good quality (compared to the quality monitoring profile stored in the storage location 116), to the highest value where all the data packets of the data stream 112 are selected for time stamping.

The determination of other parameters can of course be dependant of the comparison between the quality monitoring profile stored in the location 116 and the quality measurement that has been determined by the ingress node. In general, one understands by "operating procedure", everything that makes the ingress node, the egress node and the monitoring device working together, and all parameters of this working, e.g. the sampling rate to apply.

The quality monitoring profile can comprise one or several criteria for assessing the quality of the data streams. For instance, it can be
- a maximum value for the delay between data packets of the data stream
- a maximum value for the jitter of the data stream
- a maximum value for the packet loss rate of the data stream
- a maximum and/or minimum size for the data packets of the data stream,
- or a combination of several of these criteria.

The combination could be a logical one (i.e. several criteria are connected by a logical operator ("and", "or", etc.) or a mathematical one (a criteria is built as a linear combination of several of these criteria, some higher weight being applied to more important criteria).

Therefore, the quality monitoring profile could be constituted by a single criterion and a single threshold in the most easy case (this criterion could then be a combination of several criteria), or by several thresholds, in cases where many criteria should be considered and/or where several thresholds should be considered for a given criteria.

The determination of an operating procedure could be done according to several ways.

Figure 6A:
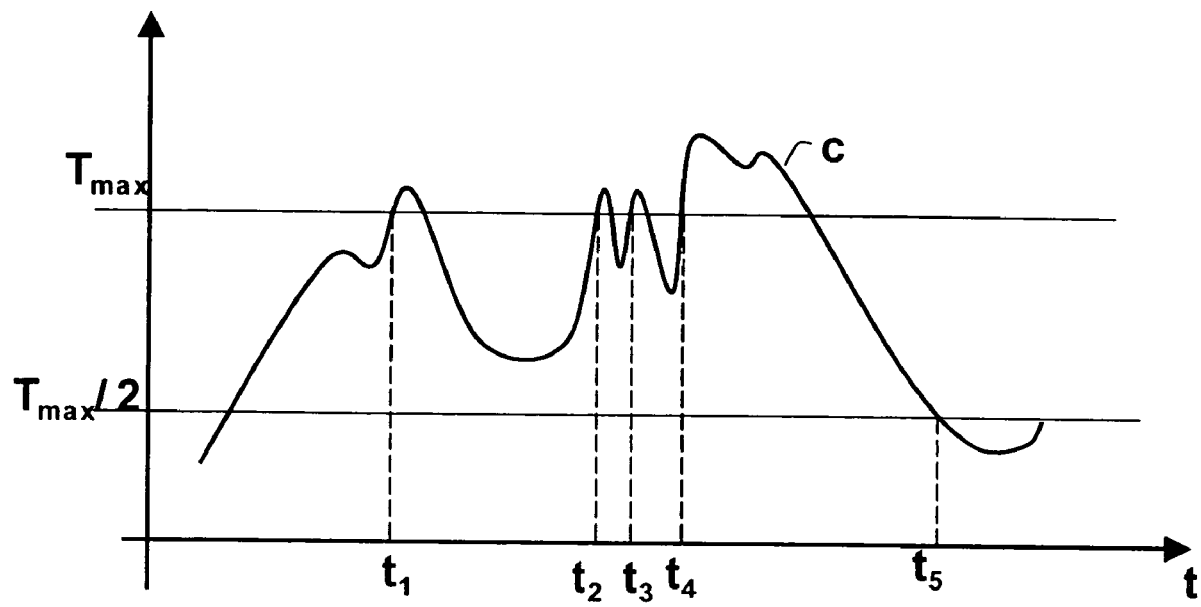
FIGS. 6a and 6b illustrate 2 examples about when determining a new operating procedure.
Figure 6B:
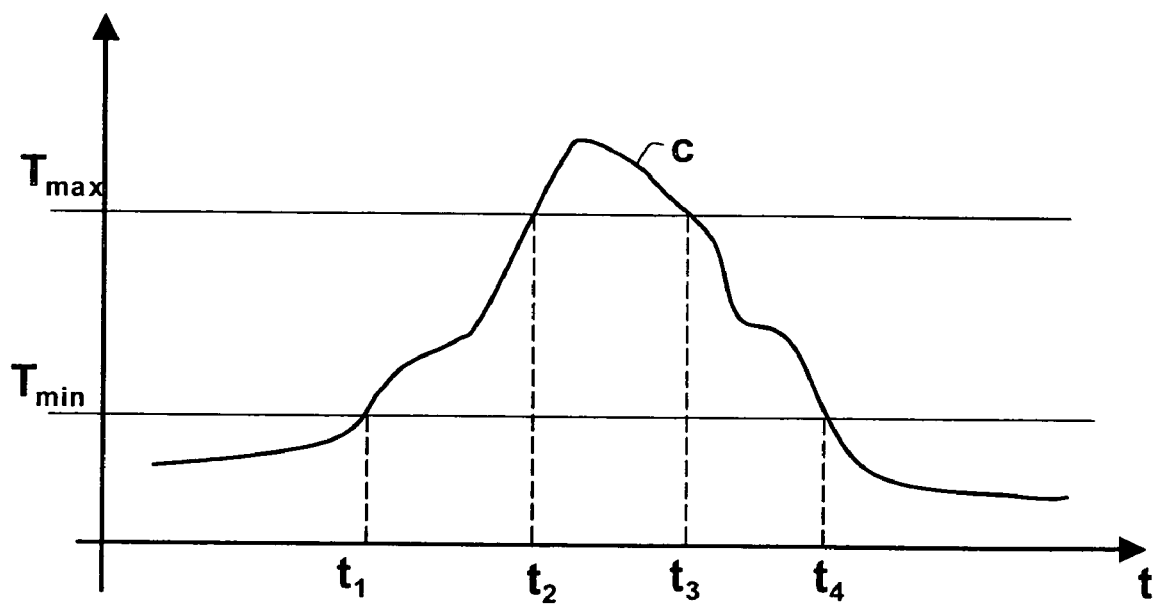

In the embodiments illustrated by FIGS. 6a and 6b, the determination is triggered by the crossing of a threshold by a criterion.

The FIGS. 6a and 6b shows 2 methods, where the criterion is constituted by a single criterion (which may be an aggregation of several criteria, like described previously). Only one criterion has been considered for the clarity of the description, but the invention can also apply to situations where several criteria are to be considered.

In a first example, described by the FIG. 6a, the quality monitoring profile comprises only one threshold $T_{max}$. The figure shows the evolution of the criterion C according to the time t. The criteria C crosses the threshold $T_{max}$ at the times $t_1$, $t_2$, $t_3$ and $t_4$.

Originally, a first operating procedure is applied. For instance, a low sampling rate is used, and the measurement packets generated by the ingress node are sent to the egress nodes.

According to this first example, the trigger for determining a new operating procedure is the multiple crossing of the threshold $T_{max}$ during a limited time frame. Here, the crossing of the threshold at time $t_1$ alone is not sufficient to trigger a change of operating procedure, whereas the multiple crossings at time $t_2$, $t_2$ and $t_4$ trigger such a change. In this example, the basis for determining the change is a number of crossings during a given time frame. Alternatively, it could be a maximum time during a first crossing and a $3^{rd}$ crossing (for instance), or other similar criteria.

At time $t_4$, a new operating procedure is then determined. It can for instance be a higher sampling rate, since the criteria C has more critical values, and it can be determined than the measurement tickets are to be sent to the monitoring device.

In this example, when the criterion C crosses a threshold $T_{max}/2$ (i.e. at time $t_5$), the first operating procedure is determined again.

In a peculiar embodiment, it can be chosen to send an alert (referred 146 in FIG. 1) to the monitoring device at each crossing. In this case, alerts would be sent to the monitoring device at times $t_1$, $t_2$, $t_3$ and $t_4$; the crossing at time $t_4$ triggering in addition the determination of an operating procedure. These alerts can enable the monitoring device 122 to display the crossings to an operator thanks to GUI, and/or to force the determination of a new operating procedure (even if the criterion for this is not fulfilled). In other words, the monitoring device 122 is informed that there is a potential problem, e.g. network congestion. In response, the monitoring device 122 may increase the sampling rate in order to increase the precision of the network monitoring or switch to another network monitoring procedure.

The FIG. 6b shows another example, where 2 thresholds are set, $T_{max}$ and $T_{min}$. The criterion C crosses the first threshold $T_{min}$, at time $t_1$ and the second threshold $T_{max}$ at time $t_2$. It crosses back the threshold $T_{max}$ at time $t_3$ and then the threshold $T_{min}$ at time $t_4$.

Upward, the crossing of the higher threshold $T_{max}$ at time $t_2$ triggers the determination of a new operating procedure, as well as the downward crossing of the lower threshold $T_{min}$ at time $t_4$. The existence of 2 different thresholds to be crossed, upward or downward, prevents any hysteresis effect.

Like previously explained, the new operating procedure can consist in increasing the sampling rate, and changing the way the measurement tickets are sent etc.

In a way similar to what has been described for the first example (FIG. 6a), all the crossings (i.e. including the crossing at time $t_1$ and $t_3$) can generate alerts 148 sent to the monitoring device 122, that enables the monitoring device to display the crossings on a GUI (Graphical User Interface) and/or force the determination of a new operating procedure.

The monitoring device 122 or a network management system (NMS) can provision the nodes, with all the desired parameters.

It can for instance send a message comprising the following parameters:
Identification of a data stream to measure or of several data streams.
  Source IP address
  Destination IP address
  RTP protocol
Quality control profile
  For instance, "jitter<5 ms"
Parameters for a first Operating procedure" to be applied when the quality control profile is met by the quality measurement. For instance:
  "intra-node measurement", meaning that the measurement ticket should be send to the egress node, like in the embodiment described by FIG. 1.
  IP address of the egress node.
  Sampling rate
  Aggregation rule (for instance, time frame according to which a measurement ticket should be sent)
Parameters for a second operating procedure to be applied when the quality profile is not met by the quality measurement. For instance:
  "monitoring device"
  Aggregation rule (for instance, time frame according to which a measurement ticket should be sent)

Of course, many other parameters could be included, while still be included in the scope of the present invention.

LIST OF REFERENCE NUMERALS

100 Network
102 Ingress Node
104 Egress Node
106 Program
108 Buffer Memory
110 Memory
112 Data Storage
114 Storage Location
116 Storage Location
118 Storage Location
120 Storage Location
121 Data Source
122 Monitoring Computer
123 Data Sink
124 Geographical User Interface
126 Program
128 Memory
125 Program
127 Buffer Memory
129 Database
131 Table
132 Memory
134 Storage Locator
136 Storage Locator
138 Request
140 Message
142 Request
144 Report
146 Alert Message
148 Sequence

The invention claimed is:

1. A method of monitoring a communication network between an ingress node and an egress node, comprising:
   determining, by an ingress node, a quality measurement of a data stream;
   determining, by the ingress node, an operating procedure by comparing the quality measurement to a quality control profile, the operating procedure indicating operation of said ingress node and an egress node, and the quality control profile being provided by a monitoring device such that the operating procedure changes based on the quality control profile;
   assigning first time stamps to data packet samples of a data stream, by said ingress node;
   assigning second time stamps to said data packet samples of said data stream, by said egress node;
   determining an evaluation of communication network performances, according to at least one of said first and second time stamps; and
   performing the assigning first time stamps step, the assigning second time stamps step, and the determining an evaluation step according to the operating procedure.

2. The method according to claim 1, wherein said operating procedure includes a sampling rate at which said data packet samples are selected for time stamping by said ingress and egress nodes.

3. The method according to claim 1, wherein said operating procedure includes at least one of
   sending from said ingress node to said egress node, measurement tickets including parameters about said operating procedure, and configuring said assigning step according to said parameters, and sending from said ingress node to a monitoring device, said measurement tickets including said parameters about said operating procedure and provisioning by said monitoring device of said parameters for configuring said assigning step.

4. The method according to claim 1, wherein the quality control profile includes at least one criterion and at least one threshold, such that the determining of said operating procedure step is performed if one of said at least one threshold is met by said at least one criterion.

5. The method according to claim 3, wherein the quality control profile is provisioned by said monitoring device.

6. An ingress node of a communication network comprising:
  a time stamping unit configured to assign first time stamps to data packet samples of a data stream, (ii) emit measurement tickets, said measurement tickets including at least said first time stamps, said measurement tickets being for an evaluation of performance of the communication network, and (iii) further configure said program according to an operating procedure; and
  a memory unit including (i) a first storage configured to store a quality control profile, and (ii) a second storage configured to store a quality measurement of said data stream, such that said ingress node is further configured to determine said operating procedure by comparing said quality measurement to the quality control profile, and the quality control profile being provided by a monitoring device such that the operating procedure changes based on the quality control profile.

7. The ingress node according to claim 6, wherein said operating procedure includes a sampling rate at which said data packet samples are selected for time stamping by said ingress node and an egress node.

8. The ingress node according to claim 6, wherein said operating procedure includes at least one of
  sending from said ingress node to said egress nodes, a measurement tickets including parameters about said operating procedure, and configuring said assigning step according to said parameters, and
  sending from said ingress node to a monitoring device, a said measurement tickets including said parameters about said operating procedure and provisioning by said monitoring device of said parameters for configuring said assigning step.

9. The ingress node according to claim 6, wherein the quality control profile includes at least one criterion and at least one threshold, such that is configured to determine said operating procedure if one of said at least one threshold is met by said at least one criterion.

10. The ingress node according to claim 8, wherein said ingress node is further configured to receive said quality control profile from a monitoring device.

11. A computer readable medium storing computer program instructions for performing a method of monitoring a communication network between an ingress node and an egress node, said computer program instructions defining the steps comprising the method according to claim 1.

12. A method of monitoring a communication network between an ingress node and an egress node, comprising:
  determining, by an ingress node, a quality measurement of a data stream;
  determining an operating procedure by comparing the quality measurement to a quality control profile stored in said ingress node, the operating procedure indicating operation of said ingress node and an egress node, and the quality control profile being provided by a monitoring device such that the operating procedure changes based on the quality control profile;
  assigning first time stamps to data packet samples of a data stream based on the operating procedure step; and
  sending the first time stamps to an egress node, such that the egress node (i) assigns second time stamps to said data packet samples of said data stream and (ii) compares the first time stamps to the second time stamps.

* * * * *